United States Patent
Dawkins et al.

(10) Patent No.: US 6,665,759 B2
(45) Date of Patent: Dec. 16, 2003

(54) METHOD AND APPARATUS TO IMPLEMENT LOGICAL PARTITIONING OF PCI I/O SLOTS

(75) Inventors: George John Dawkins, Austin, TX (US); Van Hoa Lee, Cedar Park, TX (US); David Lee Randall, Leander, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 09/798,294

(22) Filed: Mar. 1, 2001

(65) Prior Publication Data

US 2002/0124127 A1 Sep. 5, 2002

(51) Int. Cl.$^7$ .............................................. G06F 12/14
(52) U.S. Cl. ..................... 710/200; 710/22; 710/26; 710/27; 710/28; 710/308; 710/312; 710/313; 710/314; 710/315; 711/152; 711/153
(58) Field of Search .......................... 710/1–28, 200, 710/308, 312–315; 711/147–153

(56) References Cited

U.S. PATENT DOCUMENTS

| | | | | |
|---|---|---|---|---|
| 4,564,903 A | | 1/1986 | Guyette et al. | 364/300 |
| 4,843,541 A | * | 6/1989 | Bean et al. | 710/36 |
| 5,067,075 A | * | 11/1991 | Sugano et al. | 710/25 |
| 5,345,590 A | | 9/1994 | Ault et al. | 395/650 |
| 5,659,756 A | * | 8/1997 | Hefferon et al. | 710/200 |
| 6,098,113 A | * | 8/2000 | Heil et al. | 710/1 |
| 6,223,230 B1 | * | 4/2001 | Garnett et al. | 710/26 |
| 6,314,501 B1 | * | 11/2001 | Gulick et al. | 711/153 |

OTHER PUBLICATIONS

IBM Technical Disclosure Bulletin, vol. 39, No. 12, Dec. 1996, "Hypervisor High Performance Synchronous Dispatch for Coupled Systems", one page.
IBM Technical Disclosure Bulletin, vol. 38, No. 04, Apr. 1995, "VM MPG Operating as a DRF Hypervisor as a First Level Guest Under PR/SM", p. 325.
IBM Technical Disclosure Bulletin, vol. 36, No. 03, Mar. 1993, "Sharing Read–Only Memory among Multiple Logical Partitions", pp. 303–304.
IBM Technical Disclosure Bulletin, vol. 39, No. 12, Dec. 1996, "Highly Parallel Coupling Facility Emulator/Router with Shadowed Link Buffers", 2 pages.
IBM Technical Disclosure Bulletin, vol. 39, No. 06, Jun. 1996, "Coordinating Multiple Server Partitions to Enter Power–Save State", pp. 235–239.

* cited by examiner

*Primary Examiner*—Jeffrey Gaffin
*Assistant Examiner*—Mike Nguyen
(74) *Attorney, Agent, or Firm*—Duke W. Yee; Mark E. McBurney; Lisa L. B. Yociss

(57) ABSTRACT

A method, system, and computer program product for enforcing logical partitioning of input/output slots within a data processing system is provided. In one embodiment, the system includes a hypervisor and at least one DMA address checking component. The hypervisor receives non-direct-memory-access requests for access to input/output slots and prohibits devices within one logical partition from accessing the input/output slots assigned to a different logical partition. The DMA address checking component receives direct-memory-access requests and prohibits requests for addresses not within the same logical partition as the requesting device from being completed. Requests with addresses corresponding to the same logical partition as the requesting device are placed on the primary PCI bus by the DMA address checking component for delivery to the system memory.

19 Claims, 3 Drawing Sheets

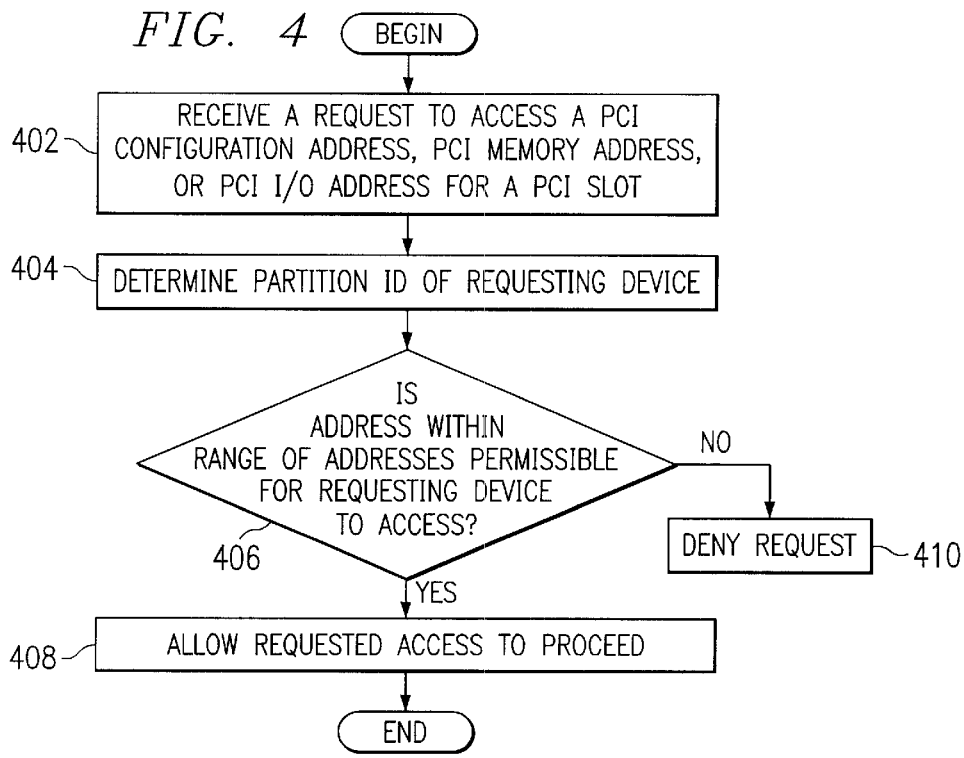
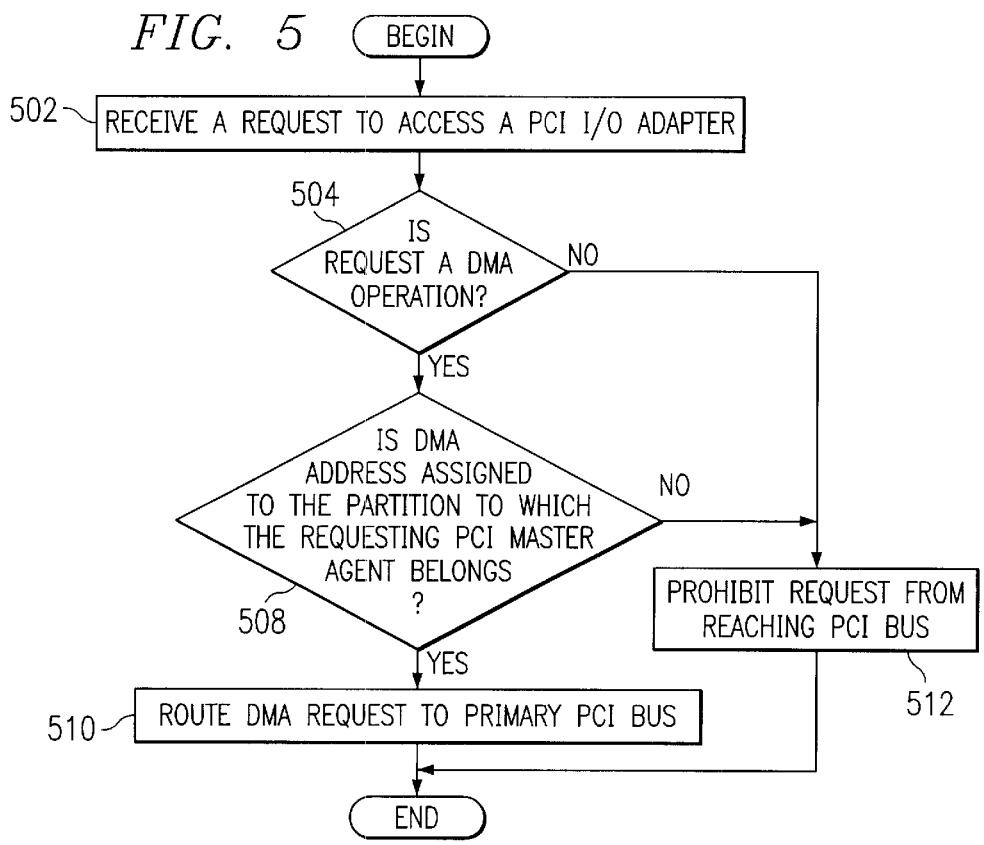

METHOD AND APPARATUS TO IMPLEMENT LOGICAL PARTITIONING OF PCI I/O SLOTS

BACKGROUND OF THE INVENTION

1. Technical Field

The present invention relates generally to an improved data processing system and, more particularly, to an improved logically partitioned data processing system. Still more particularly, the present invention relates to logically partitioning PCI I/O slots.

2. Description of Related Art

A logical partitioning (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocatable resources within the platform.

Currently, there is no mechanism that enforces logical partitioning of direct memory access (DMA) addresses as well as other accesses involving PCI I/O slots. Therefore, it would be advantageous to have an improved method and apparatus for enforcing logical partitioning among PCI I/O slots that includes enforcement of DMA address ranges.

SUMMARY OF THE INVENTION

The present invention provides a method, system, and computer program product for enforcing logical partitioning of input/output slots within a data processing system. In one embodiment, the system includes a hypervisor and at least one DMA address checking component. The hypervisor receives non-direct-memory-access requests for access to input/output slots and prohibits devices within one logical partition from accessing the input/output slots assigned to a different logical partition. The DMA address checking component receives direct-memory-access requests and prohibits requests for addresses not within the same logical partition as the requesting device from being completed. Requests with addresses corresponding to the same logical partition as the requesting device are placed on the primary PCI bus by the DMA address checking component for delivery to the system memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a flowchart illustrating an exemplary method for enforcing logical partitioning within a data processing system for non-DMA requests is depicted in accordance with the present invention; and FIG. 5 depicts a flowchart illustrating an exemplary method within a BRIDGE chip for enforcing logical partitioning for DMA processes in accordance with the present invention.

DETAILED DESCRIPTION OF THE PREFERRED EMBODIMENT

Figure 1:
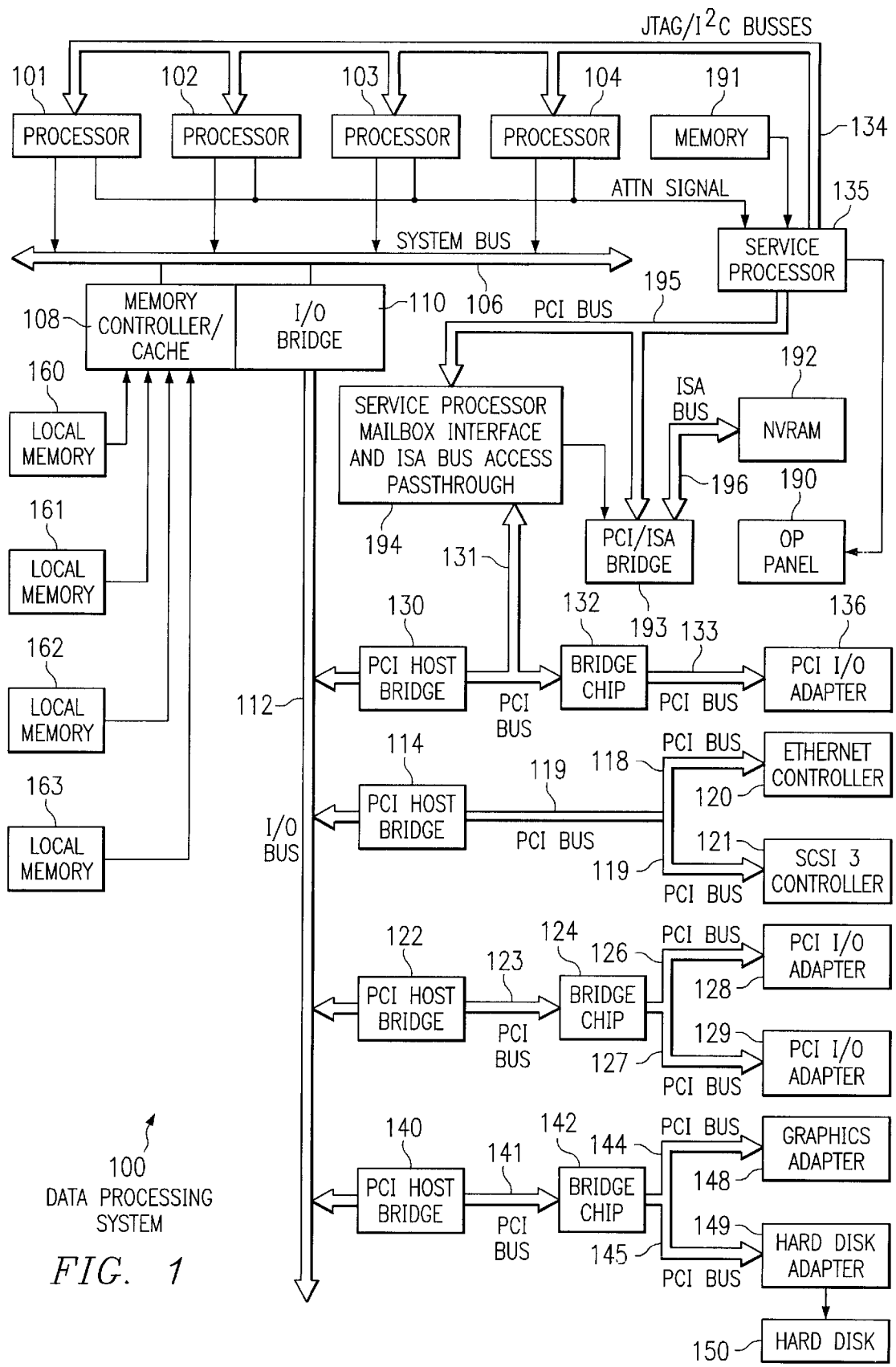
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 128–129, 136, and 148–149 may be assigned to different logical partitions.

Thus, for example, suppose data processing system 100 is divided into three logical partitions, P1, P2, and P3. Each of I/O adapters 128–129, 136, and 148–149, each of processors 101–104, and each of local memories 160–164 is assigned to one of the three partitions. For example, processor 101, memory 160, and I/O adapters 128 and 129 may be assigned to logical partition P1; processors 102–103, memory 161, and I/O adapter 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local busses 118–119. An ethernet controller 120 is connected via PCI bus 118 and an SCSI 3 controller 121 is connected via PCI bus 119.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. Typical PCI bus implementations will support between four and eight I/O adapters (i.e. expansion slots for add-in connectors). Each I/O Adapter 128–129 provides an interface between data processing system 100 and input/output devices such as, for example, other network computers, which are clients to data processing system 100. In this manner, data processing system 100 allows connections to multiple network computers.

A memory mapped graphics adapter 148 may be connected to I/O bus 112 through PCI Host Bridge 140 and bridge chip 142 ( PCI-PCI bridge ) via PCI buses 141 and 144 as depicted. Also, a hard disk 150 may also be connected to I/O bus 112 through PCI Host Bridge 140 and bridge chip 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and bridge chip 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
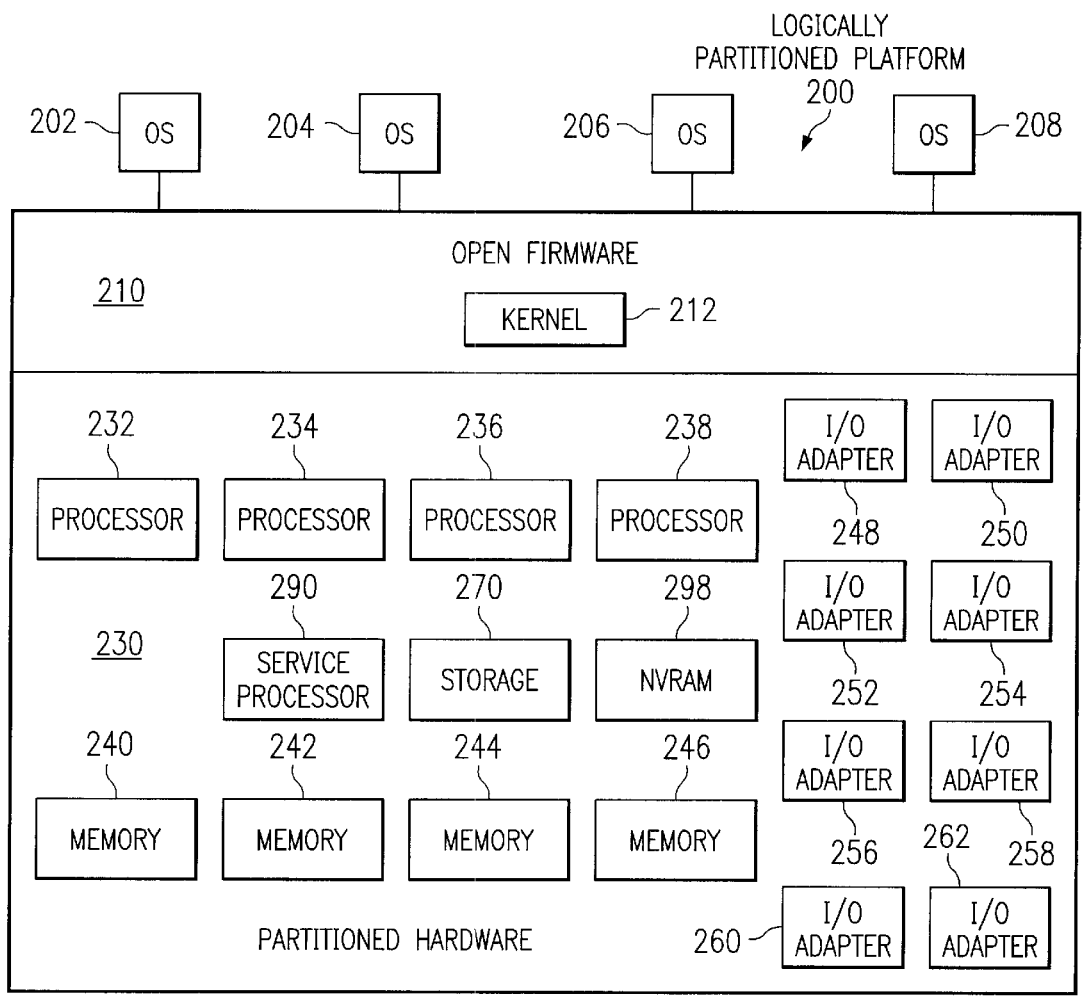
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208.

Following normal I/O discovery and configuration, each PCI host bridge, such as, for example, PCI host bridge 114, 122, or 140 in FIG. 1, is assigned a PCI memory address range and a PCI I/O address range based on the system memory map. If the system 200 is set up to be in LPAR mode as depicted in FIG. 2, OF 210 then assigned each PCI host bridge with an additional PCI memory address range. This additional PCI memory address range is to be used by a master agent on secondary PCI buses to access system memory. This range is traditionally called direct memory access (DMA) address. The advanced function routing table of the bridge chip, such as, for example, one of bridge chip 124, 132, or 142 in FIG. 1, is set to route only this PCI memory address range to the primary PCI bus.

With OF 210 providing the address checking methods, a logical partition can only perform any one of the following:

a. access PCI configuration addresses for its assigned PCI slots, b. access PCI memory address ranges and PCI I/O address ranges for its assigned PCI slots, or c. generate DMA addresses owned by the assigned PCI slots, which will be mapped into system memory addresses through a PCI host bridge's Translation Control Entry (TCE) table.

The TCE facility is a facility for the PCI Host Bridge (PHB) which is analogous to the virtual memory address translation facility provided by most processors today. That is, the TCE facility provides a mechanism to translate a contiguous address space on the PCI I/O bus to a different and possibly noncontiguous address space in system memory. It does this in a manner similar to the processor's translation mechanism, and thus breaks the address space of the system memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an PCI memory cycle I/O operation is initiated by a master agent on the PCI bus of the PHB, the TCE facility accesses the entry for that page in the TCE table corresponding to the address of the PCI cycle on the bus, and uses the data in that entry as the most significant bits of the address to access system memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in system memory is addressed, and the address bits taken from the I/O bus determines the address within the page.

Any illegal PCI configuration addresses, PCI memory addresses, and PCI I/O addresses generated from a logical partition will be rejected and prohibited by the OF 210 code to prevent the partition from accessing I/O resources not assigned to it. Similarly, the bridge chip hardware will reject and prohibit any DMA addresses generated by the PCI master agent which are not assigned to the slots. These firmware and hardware combined methods thus achieve the logical partitioning of plug-in PCI I/O slots.

Figure 3:
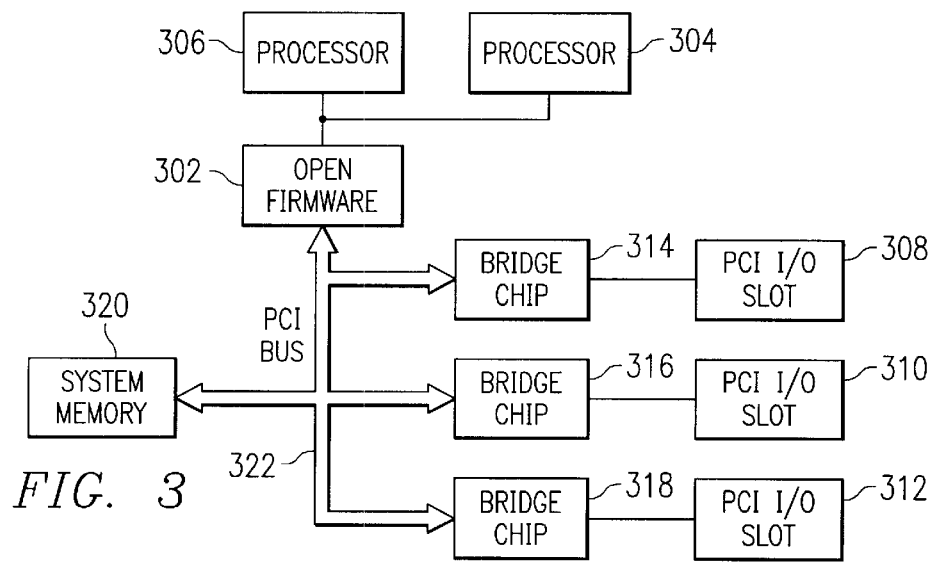
FIG. 3 depicts a block diagram illustrating system for enforcing logical partitioning of PCI I/O slots in a data processing system in accordance with the present invention.

With reference now to FIG. 3, a block diagram illustrating system for enforcing logical partitioning of PCI I/O slots in a data processing system is depicted in accordance with the present invention. Open firmware (OF) 302, which may be implemented as, for example, OF 210 in FIG. 2, enforces logical partitioning of PCI I/O slots for all requested accesses except for DMA requests. Thus, if one of processors 304–306 desires to access a PCI configuration, memory, or I/O address for one of PCI I/O adapters 308–312, the request is processed by OF 302 to determine whether the requested address is assigned to the same partition as that of the requesting processor 304–306. Any illegal PCI configuration addresses, PCI memory addresses, or PCI I/O addresses requests generated from a logical partition are rejected and prohibited by OF 302 to prevent the partition from accessing I/O resources not assigned to it. OF 302 also generates DMA addresses owned by any of PCI I/O slots 308–312 and maps the DMA addresses to system memory 320.

Any attempt by a PCI master agent, such as, for example, through one of PCI I/O slots 308–312, to initiate a DMA access is processed through an bridge chip 314–318. Only DMA addresses within the address range assigned to the logical partition to which the requesting PCI master agent belongs are routed onto the primary PCI bus 322 to system memory 320 by bridge chip 314–318. All other DMA requests are denied by bridge chip 314–318.

It should be noted that additional or different components may be utilized in place of the components depicted in FIG. 3 without departing from the scope and spirit of the present invention. For example, the system may include more than two processors. Furthermore, it should be noted that, for clarity, some components, such as the PCI host bridge have not been shown.

With reference now to FIG. 4, a flowchart illustrating an exemplary method for enforcing logical partitioning within a data processing system for non-DMA requests is depicted in accordance with the present invention. The depicted logical partitioning enforcement method may be implemented, for example, in OF 302 in FIG. 3. To begin, the firmware receives a request to access a PCI configuration address, a PCI memory address, or a PCI I/O address for a PCI slot (step 402). The firmware determines the partition ID of the requesting device (step 404) and determines whether the address requested is within the range of addresses permissible for the requesting device to access (step 406). If the address is not within a permissible range, then the requested access of the PCI slot is denied (step 406). If the address is within a permissible range, then the requested access is allowed to proceed (step 408).

With reference now to FIG. 5, a flowchart illustrating an exemplary method within an bridge chip for enforcing logical partitioning for DMA processes is depicted in accordance with the present invention. To being, the bridge chip, such as, for example, one of bridge chip 314–318 in FIG. 3, receives a request to access a PCI I/O slot (step 502) from a PCI master agent. The bridge chip determines whether the request is a DMA operation (step 504). If the request is not a DMA operation, then the request is not forwarded to the primary PCI bus since the advance function routing table for PCI non DMA operation, i.e. PCI I/O cycles, is disabled, and the bridge chip will not forward to primary bus any configuration cycles outside its bus range. These non DMA requests must be initiated by the device driver of the PCI agent from the host processor and the hypervisor, such as, for example, OF 302 in FIG. 3, will perform the address checking and enforcement of logical partitioning at that time.

If the request is a DMA operation, then the bridge chip determines whether the address requested is assigned to the partition to which the requesting PCI master agent belongs (step 508). If the address is not assigned to the same partition as the PCI master agent, then the request is denied and prohibited from reaching the primary PCI bus (step 512). If the address is assigned to the same partition as the PCI master agent making the request, then the DMA request is allowed to proceed and is routed to the primary PCI bus (step 510).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for enforcing logical partitioning of input/output slots within a logically partitioned data processing system, the system comprising:

said logically partitioned system including a hypervisor that permits simultaneous execution of independent operating system images in the logically partitioned system by creating and enforcing partitioning of a logically partitioned platform that includes processors, memory, and input/output slots, said hypervisor which receives non-direct-meniory-access requests for access to input/output slots, determines a partition identifier of a requesting device that generated a request, and uses said partition identifier to prohibits devices within one logical partition from accessing the input/output slots assigned to a different logical partition;

at least one DMA address checking component which receives requests, determines whether said requests are direct-memory-access requests for access to said input/output slots, prohibits non-direct-memory-access request from reaching a primary bus coupled to said input/output slots, and prohibits requests for addresses not within the same logical partition as the requesting device from being completed; and said hypervisor, for processing said non-direct-memory access requests for access to said input/output slots and said DMA address checking component for processing said direct-memory-access requests for access to said input/output slots, said hypervisor and said DMA address checking component being separate devices.

2. The system as recited in claim 1, wherein the hypervisor is implemented as firmware.

3. The system as recited in claim 1, wherein the DMA address checking component is implemented as hardware.

4. The system as recited in claim 1, wherein non-direct-memory-access requests received by the DMA address checking component are rejected.

5. The system as recited in claim 1, wherein the DMA address checking component forwards direct memory access requests having addresses belonging to the same logical partition as the requesting device to a primary bus for delivery to a system memory.

6. The system as recited in claim 1, wherein the input/output slots are peripheral component interconnect input/output slots.

7. The system as recited in claim 5, wherein the primary bus is a primary peripheral component interconnect bus.

8. A method for enforcing logical partitioning of direct memory access addresses within a logically partitioned data processing system, the method comprising:

said logically partitioned system including a hypervisor that permits simultaneous execution of independent operating system images in the logically partitioned system by creating and enforcing partitioning of a logically partitioned platform that includes processors, memory, and input/output slots, receiving a request within said hypervisor from a requesting device to access an input/output slot address;

determining, by said hypervisor, a partition identifier of said requesting device;

using, by said hypervisor, said partition identifier to prohibit devices within one logical partition from accessing the input/output slots assigned to a different logical partition;

responsive to a determination that the request is a direct memory access operation, determining, by a DMA address checking component, whether the address is assigned to the same partition as the requesting device;

responsive to a determination that the address is assigned to a different partition as the requesting device, denying by said DMA address checking component, access to the address; and processing non-direct-memory access requests by said hypervisor and processing direct memory access requests by said DMA address checking component.

9. The method as recited in claim 8, further comprising:

responsive to a determination that the address belongs to the same partition as the requesting device, forwarding the request to a system memory.

10. The method as recited in claim 8, further comprising:

responsive to a determination that the request is not a direct memory access operation, rejecting the operation.

11. The method as recited in claim 8, wherein the requesting device is a peripheral component interconnect master agent.

12. The method as recited in claim 10, further comprising:

responsive to a determination by the hypervisor that the address is assigned to a different partition from that to which the requesting device is assigned, denying the request.

13. The method as recited in claim 10, further comprising:

responsive to a determination by the hypervisor that the address is assigned to the same partition as that to which the requesting device is assigned, allowing the request to proceed.

14. A computer program product in a computer readable media for use in a logically partitioned data processing system for enforcing logical partitioning of direct memory access addresses within the data processing system, the computer program product comprising:

said logically partitioned system including a hypervisor that permits simultaneous execution of independent operating system images in the logically partitioned system by creating and enforcing partitioning of a logically partitioned platform that includes processors, memory, and input/output slots, instructions for receiving a request within said hypervisor from a requesting device to access an input/output slot address;

instructions for determining, by said hypervisor, a partition identifier of said requesting device;

instructions for using, by said hypervisor, said partition identifier to prohibit devices within one logical partition from accessing the input/output slots assigned to a different logical partition;

instructions, responsive to a determination that the request is a direct memory access operation, for determining, by a DMA address checking component, whether the address is assigned to the same partition as the requesting device;

instructions, responsive to a determination that the address is assigned to a different partition as the requesting device, for denying, by said DMA address checking component access to the address; and instructions for processing non-direct-memory-access requests by said hypervisor and for processing direct-memory-access-requests by said DMA address checking component.

15. The computer program product as recited in claim 14, further comprising:

instructions, responsive to a determination that the address belongs to the same partition as the requesting device, for forwarding the request to a system memory.

16. The computer program product as recited in claim 14, further comprising:

instructions, responsive to a determination that the request is not a direct memory access operation, for rejecting the request.

17. The computer program product as recited in claim 14, wherein the requesting device is a peripheral component interconnect master agent.

18. The computer program product as recited in claim 16, further comprising:

instructions, responsive to a determination by the hypervisor that the address is assigned to a different partition from that to which the requesting device is assigned, for denying the request.

19. The computer program product as recited in claim 16, further comprising:

instructions, responsive to a determination by the hypervisor that the address is assigned to the same partition as that to which the requesting device is assigned, for allowing the request to proceed.

\* \* \* \* \*

UNITED STATES PATENT AND TRADEMARK OFFICE
CERTIFICATE OF CORRECTION

PATENT NO. : 6,665,759 B2
DATED : December 16, 2003
INVENTOR(S) : Dawkins et al.

It is certified that error appears in the above-identified patent and that said Letters Patent is hereby corrected as shown below:

Column 7,
Lines 41-42, after "receives" delete "non-direct-meniory-access" and insert -- non-direct-memory-access --.
Line 45, before "devices" delete "prohibits" and insert -- prohibit --.
Line 56, after "hypervisor" delete ",".

Column 8,
Line 33, after "denying" insert -- , --.

Column 9,
Line 22, after "component" insert -- , --.

Signed and Sealed this

Twenty-seventh Day of December, 2005

JON W. DUDAS
*Director of the United States Patent and Trademark Office*